United States Patent [19]

Chambers

[11] Patent Number: 5,259,590
[45] Date of Patent: Nov. 9, 1993

[54] VALVE SEAT FOR HIGH TEMPERATURE VALVE

[75] Inventor: James F. Chambers, Little Rock, Ark.

[73] Assignee: Grove Valve & Regulator Company, Oakland, Calif.

[21] Appl. No.: 916,960

[22] Filed: Jul. 20, 1992

[51] Int. Cl.$^5$ ............................. F16K 5/06; F16K 5/20
[52] U.S. Cl. .................................... 251/334; 251/160; 251/163; 251/315 DU; 251/315 MT
[58] Field of Search ................ 251/334, 163, 160, 315

[56] References Cited

U.S. PATENT DOCUMENTS

| | | | |
|---|---|---|---|
| 3,473,554 | 10/1969 | King | 251/163 X |
| 4,247,079 | 1/1981 | Friess | 251/334 X |
| 4,262,688 | 4/1981 | Bialkowski | 251/160 X |
| 4,917,354 | 4/1990 | Chambers | 251/163 |

FOREIGN PATENT DOCUMENTS 2385016 11/1978 France ................. 251/334

OTHER PUBLICATIONS

Orbit Valve International, Technical Catalogue pp. 4 and 5 Oct. 1988.

*Primary Examiner*—Arnold Rosenthal
*Attorney, Agent, or Firm*—Flehr, Hohbach, Test, Albritton & Herbert

[57] ABSTRACT

Valve such as a ball valve with a metal seat ring assembly comprising an outer ring seated in the valve body and an inner ring seated in the outer ring. The outer ring is formed with a lip projecting inwardly and presenting a sealing surface for contact with the valve closure member. The inner ring is formed with a lip behind which is an annular groove which permits flexing of such lip. The inner ring is seated within the outer ring. There is a small clearance between the lip and the outer ring which causes sealing between the closure member and the inner ring following by sealing between the closure member and the outer ring. The configuration and clearances of such lips is such that in initial closing the valve closure member contacts the lip of the inner ring causing it to flex and on final closing it contacts the lip of the outer ring causing it to flex.

7 Claims, 3 Drawing Sheets

VALVE SEAT FOR HIGH TEMPERATURE VALVE

This invention relates to a valve and valve seat which are suitable for high temperature service, for example, at temperatures above 450° F. The invention is especially applicable to ball valves and more particularly to what are called "rising stem" or "dual action" ball valves, such as that illustrated in U.S. Pat. No. 4,917,354. In such a valve the valve stem is turned while it is moving axially and in so doing it causes the ball to unseat from closed position.

The invention is however, applicable to other types of valves such as quarter-turn ball valves and globe valves.

BACKGROUND OF THE INVENTION

In rising stem or dual action ball valves such as those described in U.S. Pat. No. 4,917,354 a ball formed with an opening extending through it is rotated 90° between closed position wherein it closes the valve and open position wherein it opens the valve. The valve includes a valve stem which is caused to move up and down by a handwheel or other actuator and during such vertical motion, it is rotated. Cooperating cam surfaces on the lower end of the stem and on the upper portion of the ball cause the ball to move into and away from the valve seat during closing and opening of the valve. This action facilitates opening and closing the valve.

When the ball is turned to closed position it seats against a seat ring which is fitted into the valve body surrounding the ball. For secure sealing of the valve when in closed position, an organic substance such as Teflon or Nylon may be used as a component of the seat ring and which yields under pressure sufficiently to conform to the mating surface of the ball, thereby creating an effective seal. However, such organic materials deteriorate when subjected to high temperatures.

Expedients that are presently in use are various forms of metallic seat which require very accurate machining and finishing processes. Because of the rigidity of such materials, the machining and finishing must be done very accurately, and even so wear during use and the effect of high temperature will cause defects in the mating surfaces of the ball (or other closure) and the seat.

OBJECTS OF THE INVENTION

It is an object of the invention to provide improved seat sealing capability for valves which is reliable at high temperatures, e.g., above 450° F.

It is a particular object of the invention to provide metallic seating means which avoids or diminishes the need for highly accurate machining and finishing and which is effective and durable in use.

These and other objects of the invention will be apparent from the ensuing description and the appended claims.

BRIEF SUMMARY OF THE INVENTION

In accordance with the invention, a metallic seat ring is employed which is an assembly of an outer ring seated in the valve body and an inner ring seated in the outer ring. The inner ring has a seating or sealing surface behind which is a groove which permits flexing of the seating surface in response to the pressure exerted by the ball or other valve closure member. The outer ring, whose inner, annular surface is shaped to receive and hold the inner ring, has a lip which overlies but is spaced from the seating surface of the inner ring. By reason of this configuration, both the lip of the outer ring and the seating surface of the inner ring can yield under pressure of the valve closure member and effect a tight seal notwithstanding irregularities in the surfaces of the mating parts due to inaccuracies of finishing or due to wear resulting from use.

DETAILED DESCRIPTION OF THE PREFERRED EMBODIMENTS

Figure 1:
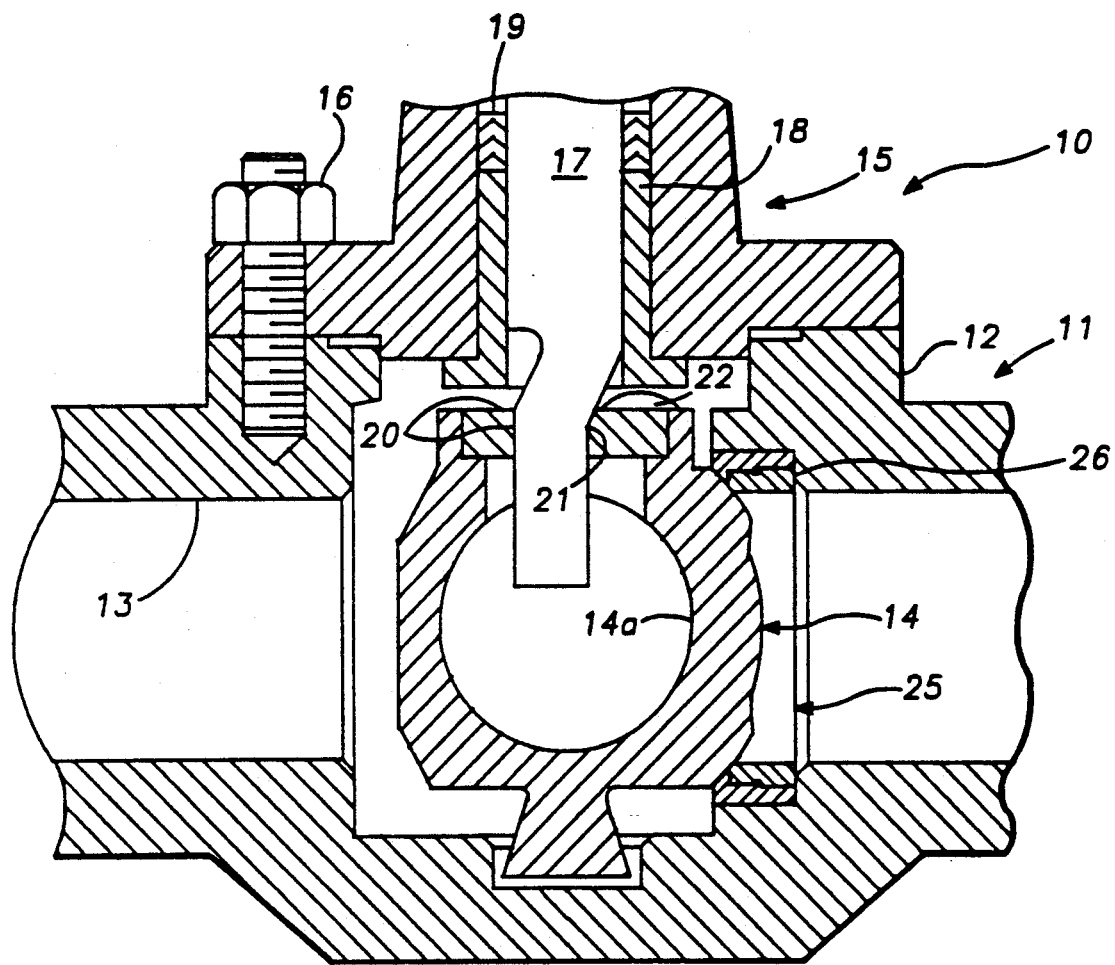
FIG. 1 is a partial view in section of a valve in accordance with the present invention.

Referring now to FIG. 1, a vertical mid-section through a valve 10 is shown. The valve body is shown at 11 having flanges (not shown) for attachment to a pipe (also not shown). The valve body has a flow passage 13 which is closed when the valve is in closed position and the valve has a ball 14 having a flow passage 14a through which fluid flows when the valve is turned 90° from the position shown in FIG. 1. A fragment of a bonnet 15 is shown which is secured by bolts, one of which is shown at 16, to the valve body. A fragment of a valve stem is shown at 17 which is rotatable and movable axially in a bushing 18 above which is a seal 19.

In operation, and as described in U.S. Pat. No. 4,917,354, a handwheel (not shown herein) is used to move the valve stem 17 axially and as it turns a pin extending through the stem and seated in spiral slots in a sleeve (none of which are shown) causes the stem to rotate. The lower end of the stem has cam surfaces at 20 which act on cam surfaces 21 on the ball 14. Meanwhile the lower end of the bushing 18 rides on a raised portion 22 of the ball 14 which acts as a trunnion. The cam action at the surfaces 20 and 21 serve to wedge the ball to make or break the seal between the ball and the seat ring 25. Continued turning of the valve stem causes the ball to rotate 90°. Reference is also made to description of operation in U.S. Pat. No. 4,917,354.

Figure 2:
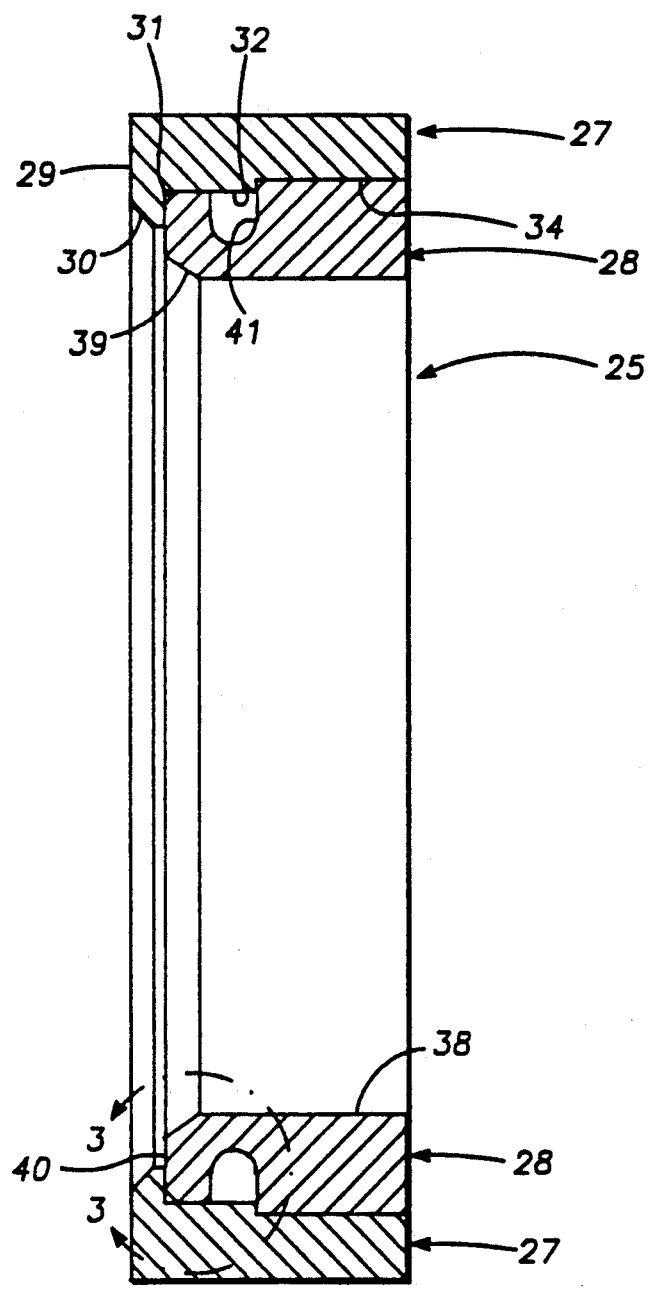
FIG. 2 is a view in mid-section of the valve seat of the invention.

Referring now to FIG. 2 the seat ring assembly 25 is shown separated from the valve. In use the seat ring assembly 25 is fitted into a recess 26 formed in the valve body around the flow passage 13, being press fitted into this recess. See FIG. 1. The seat ring assembly 25 is made in two parts, an outer ring 27 and an inner ring 28.

Figure 3:
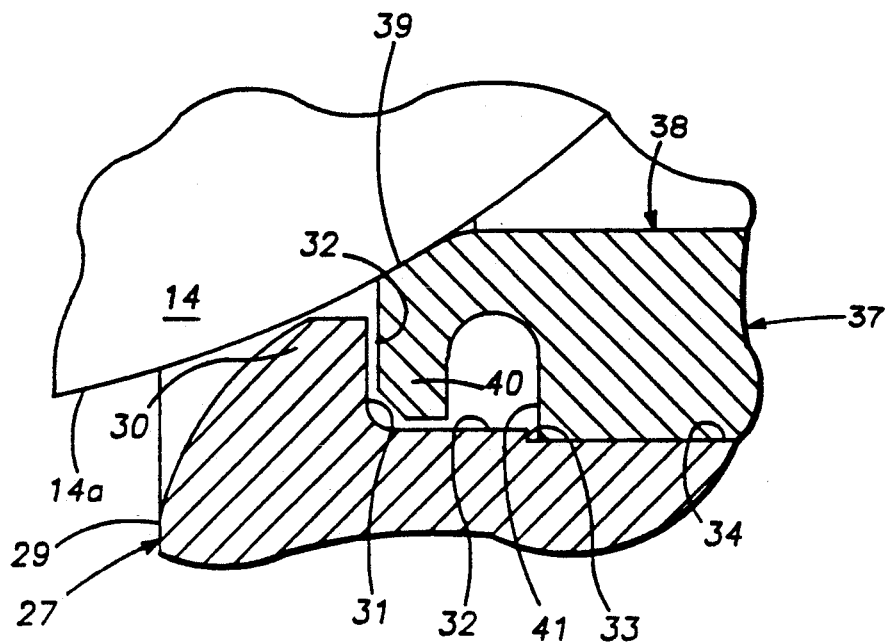
FIG. 3 is a fragmentary view of the valve at the commencement of sealing during closing of the valve.

The outer ring 27 is of a diameter to fit tightly in the seat recess 26 in valve body 11. Referring to FIG. 3 as well as FIGS. 1 and 2, the outer ring 27 has a vertical surface 29, a slanting lip 30, a vertical surface 31, a cylindrical surface 32, a vertical surface 33 and a cylindrical surface 34.

The inner ring 28 has a body portion 37 of cylindrical configuration which fits into surface of outer ring 27, an inner cylindrical surface 38 which has the same diameter as the flow passage 13 of the valve, a slanting surface 39 and a lip 40. The lip 40 is separated from the body portion 37 by a 360° annular groove 41 and is spaced from the vertical and horizontal surfaces 31 and 32.

Figure 4:
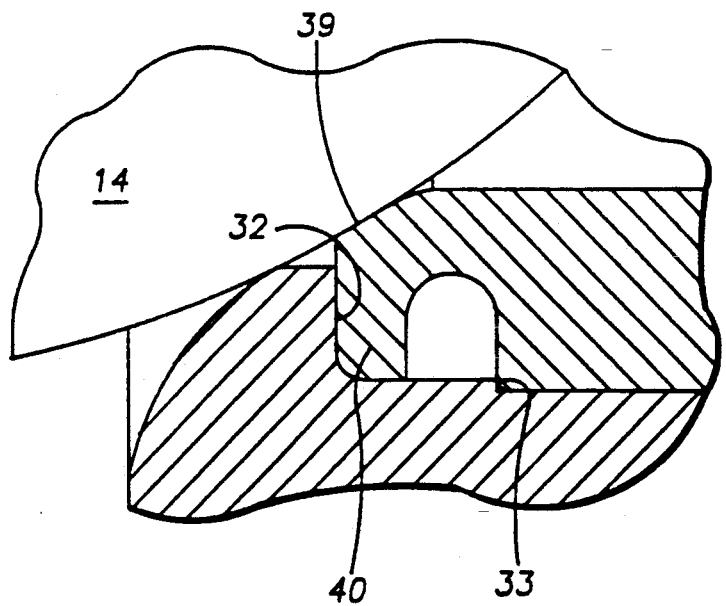
FIG. 4 is a similar view of the termination of sealing.

Referring now to FIGS. 3 and 4, FIG. 3 shows the ball 14 initially contacting the lip 40 of inner ring 28 but not yet contacting the lip 30 of outer ring 27. A further turn of the valve stem 17 brings the ball 14 into contact with the lip 30 of outer ring 27 as shown in FIG. 4. As each of the lips 40 and 30 is contacted by the ball 14, pressure of the ball causes the lip 40 or 30 to flex. Such flexing is permitted in the case of lip 40 by reason of its configuration and by reason of the groove 41 and the small clearance, e.g., 0.015 inch, between the lip 40 and surface 32 of outer ring 27. Flexing of lip 30 is permitted by reason of a small clearance, e.g. 0.015 inch, between lips 30 and 40 and by reason of the configuration of lip 30.

By reason of this double sealing and flexing, irregularities in the sealing surfaces resulting from inaccurate finishing and/or from wear are accommodated. The sealing ring may be made of stainless steel which is resistant to corrosive fluids.

The inner ring may be used without the outer ring but a double seating ring assembly as shown is preferred because the outer ring provides a seal if the inner ring should fail and because the outer ring protects the inner ring.

It will, therefore be apparent that a new and useful high temperature valve seat has been provided.

I claim:

1. In a valve comprising a valve body having a flow passage for flow of fluid through the valve and a valve closure member of metal construction movable between an open position allowing such flow and a closed position preventing such flow, the improvement which comprises a valve seat of metal construction retained in said valve body and surrounding said flow passage, said valve seat having a metallic sealing surface which is in sealing contact with said closure member when the latter is in closed position, said valve seat being flexible such that it flexes under pressure exerted by the closure member thereby accommodating irregularities in the sealing surfaces of the valve seat and the closure member, said sealing surfaces being metallic and constituting the entire seal of the valve.

2. The improvement of claim 1 wherein said valve seat includes a lip portion having a metallic sealing surface which bears against the closure member when the latter is in closed position, there being a groove in the valve seat inwardly of said lip to allow flexing of the lip.

3. The improvement of claim 1 wherein said valve seat comprises an outer ring seated in said valve body and an inner ring seated in said outer ring, said inner ring having a metallic sealing surface which seals against the closure member when the latter is in its closed position, there being a groove formed in said inner ring inwardly from said sealing surface to form a lip which flexes under pressure from said closure member.

4. A valve comprising a valve body having a flow passage for flow of fluid through the valve and a valve closure member of metal construction movable between an open position allowing such flow and a closed position preventing such flow, and a seat ring assembly for sealing contact with said closure member when it is in closed position, said seating assembly comprising:

(a) an outer, metallic ring seated in said valve body surrounding said flow passage, said outer ring being formed with a lip extending radially inwardly and surrounding said flow passage, said lip presenting a metallic sealing surface to said closure member when the latter is in closed position, (b) an inner ring seated within said outer ring and surrounding said flow passage, said inner ring being formed with a lip having a metallic sealing surface which contacts the closure member when the latter is in closed position, there being a groove formed in said inner ring inwardly of said lip to permit flexing of the lip.

(c) the metallic sealing surfaces of the outer and inner rings constituting the entire seal against the closure member.

5. The valve of claim 4 wherein said lips are so configured that the valve closure member, during initial closing of the valve, contacts the lip of said inner ring causing it to flex and form a first seal and during further closing of the valve contacts the lip of said outer ring causing it flex and form a second seal.

6. The valve of any of claims 1 to 5 in which the valve is a ball valve and the closure member is a ball.

7. The valve of any of claims 1 to 5 wherein the valve is a rising stem, dual action ball valve.

* * * * *